(12) United States Patent
Raman et al.

(10) Patent No.: US 12,198,172 B2
(45) Date of Patent: *Jan. 14, 2025

(54) TRUSTED FULFILLMENT AGENT NETWORK

(71) Applicant: eBay Inc., San Jose, CA (US)

(72) Inventors: Srinivasan Raman, Cupertino, CA (US); Frank Anthony Nuzzi, Pflugerville, TX (US)

(73) Assignee: EBAY INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,775

(22) Filed: Aug. 24, 2023

(65) Prior Publication Data

US 2023/0401619 A1    Dec. 14, 2023

Related U.S. Application Data

(63) Continuation of application No. 17/097,544, filed on Nov. 13, 2020, now Pat. No. 11,776,031, which is a continuation of application No. 15/910,415, filed on Mar. 2, 2018, now Pat. No. 10,853,861, which is a continuation of application No. 15/687,593, filed on Aug. 28, 2017, now abandoned, which is a continuation of application No. 13/679,392, filed on Nov. 16, 2012, now Pat. No. 9,747,624.

(60) Provisional application No. 61/680,121, filed on Aug. 6, 2012.

(51) Int. Cl.
*G06Q 30/00* (2023.01)
*G06Q 30/0601* (2023.01)

(52) U.S. Cl.
CPC ................ *G06Q 30/0613* (2013.01)

(58) Field of Classification Search
CPC ................................ G06Q 30/06–08
See application file for complete search history.

(56) References Cited

U.S. PATENT DOCUMENTS

| | | | |
|---|---|---|---|
| 9,747,624 B2 * | 8/2017 | Raman | G06Q 30/0613 |
| 10,853,861 B2 | 12/2020 | Raman et al. | |
| 11,776,031 B2 | 10/2023 | Raman et al. | |
| 2002/0087469 A1 | 7/2002 | Ganesan et al. | |
| 2004/0049446 A1 * | 3/2004 | Seljeseth | G06Q 40/04 705/37 |
| 2007/0083442 A1 * | 4/2007 | Peters | G06Q 30/0641 705/26.8 |
| 2009/0240610 A1 * | 9/2009 | Barsade | G06Q 40/123 705/34 |

(Continued)

OTHER PUBLICATIONS

"U.S. Appl. No. 13/679,392, Restriction Requirement mailed Jul. 10, 2015", 5 pgs.

(Continued)

*Primary Examiner* — Ethan D Civan
(74) *Attorney, Agent, or Firm* — SCHWEGMAN LUNDBERG & WOESSNER, P.A.

(57) ABSTRACT

A system and method for a trusted fulfillment agent network system is described. A network of trusted fulfillment agents is generated for a seller in an online marketplace. A transaction between a buyer and the seller corresponding to a listing of the seller in the online marketplace is accessed. A request is generated to the network of trusted fulfillment agents of the seller to fulfill a shipment of an item from the listing to the buyer on behalf of the seller.

20 Claims, 8 Drawing Sheets

(56) References Cited

U.S. PATENT DOCUMENTS

2014/0040071 A1     2/2014   Raman et al.
2017/0358018 A1   12/2017   Raman et al.
2018/0260865 A1     9/2018   Raman et al.
2021/0133842 A1     5/2021   Raman et al.

OTHER PUBLICATIONS

"U.S. Appl. No. 13/679,392, Non Final Office Action mailed Sep. 23, 2015", 21 pgs.
"U.S. Appl. No. 13/679,392, Final Office Action mailed Nov. 10, 2016", 13 pgs.
"U.S. Appl. No. 13/679,392, Notice of Allowance mailed Apr. 21, 2017", 8 pgs.
"U.S. Appl. No. 15/687,593, Preliminary Amendment filed Jan. 9, 2018", 6 pgs.
"U.S. Appl. No. 15/687,593, Non Final Office Action mailed Jan. 12, 2018", 11 pgs.
"U.S. Appl. No. 15/910,415, Non Final Office Action mailed Mar. 5, 2020", 8 pgs.
"U.S. Appl. No. 15/910,415, Notice of Allowance mailed Jul. 31, 2020", 8 pgs.
"U.S. Appl. No. 17/097,544, Preliminary Amendment filed Jan. 27, 2021", 6 pgs.
"U.S. Appl. No. 17/097,544, Non Final Office Action mailed Jan. 24, 2023", 8 pgs.
"U.S. Appl. No. 17/097,544, Notice of Allowance mailed May 26, 2023", 5 pgs.

\* cited by examiner

TRUSTED FULFILLMENT AGENT NETWORK

CROSS-REFERENCE TO RELATED APPLICATIONS

This application is a continuation of U.S. application Ser. No. 17/097,544, filed Nov. 13, 2020, which is a continuation of U.S. application Ser. No. 15/910,415, filed Mar. 2, 2018, which is a continuation of U.S. application Ser. No. 15/687,593, filed Aug. 28, 2017, which is a continuation of U.S. application Ser. No. 13/679,392, filed Nov. 16, 2012, which claims the benefit of U.S. Provisional Application No. 61/680,121, filed Aug. 6, 2012, each of which is hereby incorporated by reference in its entirety.

TECHNICAL FIELD

This application relates generally to the field of computer technology, and in a specific example embodiment, a method and system for a fulfillment network.

BACKGROUND

Online marketplaces include many sellers listing items for sale. Buyers buy these items and sellers ship the item to the buyer upon receipt of payment. Many buyers are located across the country or across many geographical regions. For a seller offering free shipping, the shipping cost is higher to ship to a buyer geographically closer to the buyer than to another buyer further away from the seller. Furthermore, asides from shipping cost, the shipping duration increases with the shipping distance.

BRIEF DESCRIPTION OF THE DRAWINGS

The present invention is illustrated by way of example, and not by way of limitation, in the figures of the accompanying drawings in which.

DETAILED DESCRIPTION

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

A system and method for a trusted fulfillment agent network system is described. A network of trusted fulfillment agents is generated for a seller in an online marketplace. A transaction between a buyer and the seller corresponding to a listing of the seller in the online marketplace is accessed. A request is generated to the network of trusted fulfillment agents of the seller to fulfill a shipment of an item from the listing to the buyer on behalf of the seller.

System Architecture

Figure 1:
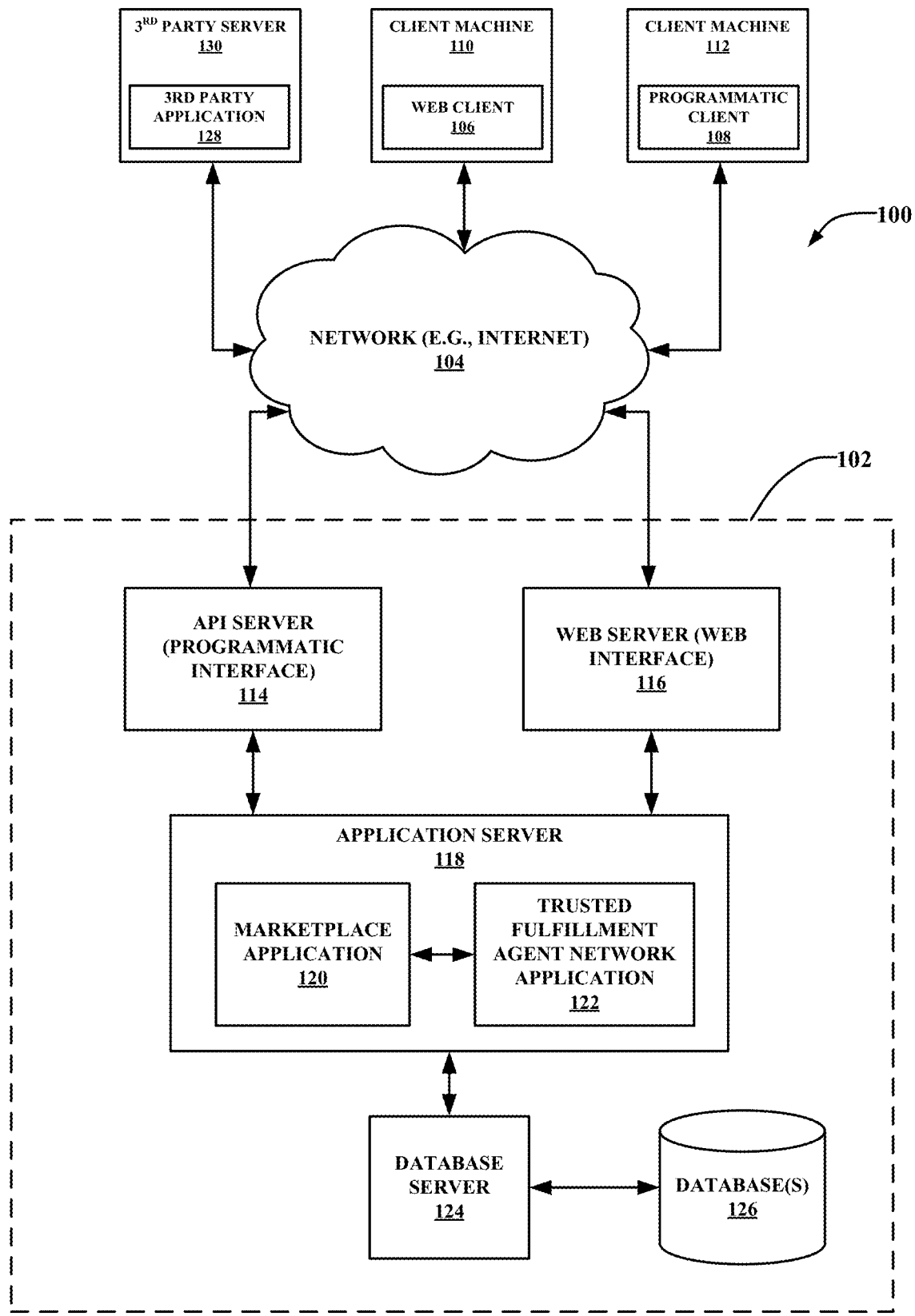
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a publication/publisher system where clients may communicate and exchange data within the network system 100. The data may pertain to various functions (e.g., online item purchases) and aspects (e.g., managing content and user reputation values) associated with the network system 100 and its users. Although illustrated herein as a client-server architecture as an example, other embodiments may include other network architectures, such as a peer-to-peer or distributed network environment.

A data exchange platform, in an example form of a marketplace application 120 and a trusted fulfillment agent network application 122, may provide server-side functionality, via a network 104 (e.g., the Internet) to one or more clients. The one or more clients may include users that utilize the network system 100 and more specifically, the marketplace application 120 and the trusted fulfillment agent network application 122, to exchange data over the network 104. These transactions may include transmitting, receiving (communicating) and processing data to, from, and regarding content and users of the network system 100. The data may include, but are not limited to, content and user data such as user profiles; user attributes; product and service reviews and information, such as pricing and descriptive information; product, service, manufacturer, and vendor recommendations and identifiers; product and service listings associated with buyers and sellers; auction bids; and transaction data such as collection and payment, shipping transactions, shipping label purchases, and real time synchronization of financial journals, among others.

In various embodiments, the data exchanges within the network system 100 may be dependent upon user-selected functions available through one or more client or user interfaces (UIs). The UIs may be associated with a client machine, such as a client machine 110 using a web client 106. The web client 106 may be in communication with the marketplace application 120 via a web server 116. The UIs may also be associated with a client machine 112 using a programmatic client 108, such as a client application, or a third party server 130 with a third party application 128. It can be appreciated that in various embodiments the client machines 110, 112, or third party server 130 may be associated with a buyer, a seller, a third party electronic commerce platform, a payment service provider, a shipping service provider, a financial institution system, each in communication with the network-based publisher 102 and optionally each other. The buyers and sellers may be any one of individuals, merchants, or service providers, among other things.

Turning specifically to the marketplace application 120 and the trusted fulfillment agent network application 122, an application program interface (API) server 114 and a web server 116 are coupled to, and provide programmatic and web interfaces respectively to, one or more application servers 118. The application server 118 hosts one or more marketplace applications 120 and the trusted fulfillment agent network application 122. The application server 118 is, in turn, shown to be coupled to one or more database servers 124 that facilitate access to one or more database(s) 126.

In one embodiment, the web server 116 and the API server 114 communicate and receive data pertaining to listings and transactions, among other things, via various user input tools. For example, the web server 116 may send and receive data to and from a toolbar or webpage on a browser application (e.g., web client 106) operating on a client machine (e.g., client machine 110). The API server 114 may send and receive data to and from an application (e.g., programmatic client 108 or third party application 128) running on another client machine (e.g., client machine 112 or 3$^{rd}$ party server 130).

In one embodiment, the marketplace application 120 provides listings and price-setting mechanisms whereby a user may be a seller or buyer who lists or buys goods and/or services (e.g., for sale) published on the marketplace application 120.

In one embodiment, the trusted fulfillment agent network application 122 includes a system and a method for generating and operating a trusted fulfillment agent network of a seller of the marketplace application 120.

Figure 2:
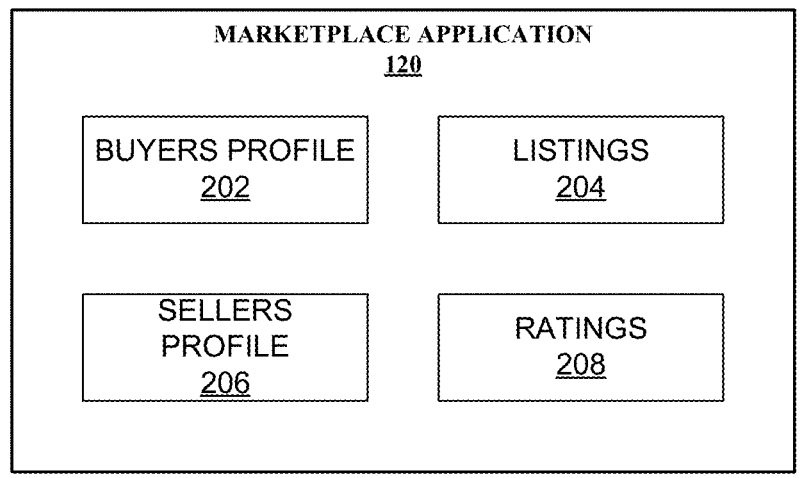
FIG. 2 shows a block diagram illustrating one example embodiment of a publishing application.

FIG. 2 shows a block diagram illustrating one example embodiment of the marketplace application 120. The marketplace application 120 includes, for example, a buyers profile module 202, a sellers profile module 204, a listings module 206, and a ratings module 208.

The buyers profile module 202 may be configured to generate and store profiles of buyers of the marketplace application 120. For example, the profiles of the buyers may include names, addresses (including shipping address), and transaction history.

The sellers profile module 204 may be configured to generate and store profiles of sellers of the marketplace application 120. For example, the profiles of the seller may include names, addresses (including shipping address), and transaction history.

The listings module 206 may be configured to generate and store listings from the sellers. The listings may identify items for sale in the marketplace application 120.

The ratings module 208 may be configured to generate and store ratings, including feedback ratings of buyers and sellers. In another embodiment, the ratings module 208 may also be configured to generate transaction volume and shipping volume on the marketplace application 120, or any other online marketplace.

Figure 3:
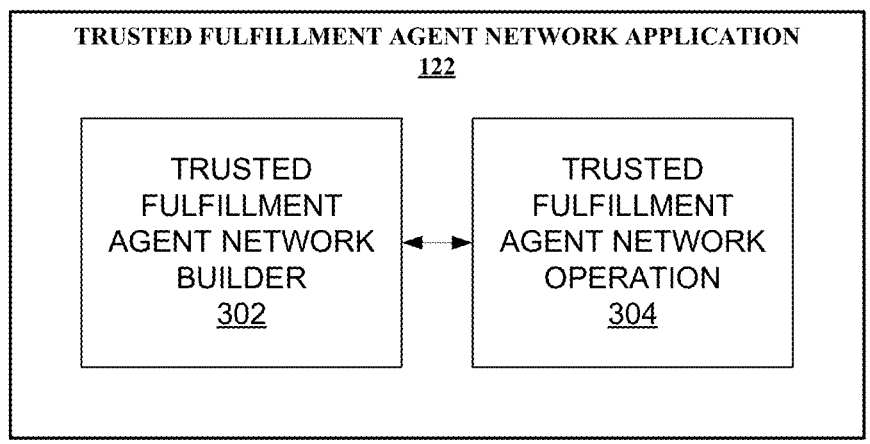
FIG. 3 shows a block diagram illustrating one example embodiment of a trusted fulfillment agent network application.

FIG. 3 shows a block diagram illustrating one example embodiment of the trusted fulfillment agent network application 122. The trusted fulfillment agent network application 122 may include a trusted fulfillment agent network builder module 302, and a trusted fulfillment agent network operation module 304.

The trusted fulfillment agent network builder module 302 may generate recommendations for a network of trusted fulfillment agents for a seller in the online marketplace. For example, a seller of the online marketplace may form and establish relationships with other sellers from the online marketplace or any other marketplaces to generate the network of trusted fulfillment agents. In other words, an agent from the network of trusted fulfillment agents may include a seller from the online marketplace or another marketplace to fulfill a shipment of an item corresponding to a listing on behalf of the seller. In another embodiment, the agent may have no electronic commerce presence in any marketplace. An example embodiment of the trusted fulfillment agent network builder module 302 is described in more details below with respect to FIG. 4. In an embodiment, a seller may be able to enter the user identifiers of one or more users in the marketplace application 120 or any other online marketplace to form his/her network of trusted fulfillment agents.

The trusted fulfillment agent network operation module 304 may access a transaction between a buyer and the seller corresponding to a listing of the seller in the online marketplace and generate a request to the network of trusted fulfillment agents of the seller to fulfill a shipment of an item from the listing to the buyer on behalf of the seller. For example, a seller may request an agent from his/her trusted fulfillment agent network to fulfill an order for an item to a buyer geographically located closer the agent. An example embodiment of the trusted seller for operation module 304 is described in more details below with respect to FIG. 5.

In another embodiment, prior to generating the request, the trusted fulfillment agent network operation module 304 computes a profit margin the seller desires along with various fees involved (e.g., listing fees, shipping and handling, and so forth). The trusted fulfillment agent network operation module 304 then computes the highest price the seller can pay based on the profit margin. For example, a reverse bidding process may be used to determine the minimum price for the request. In that example scenario, the seller may provide the following information:
Latest date and time of shipment
Latest date and time of delivery
Characteristics of shipment to be used
Date and time when this fulfillment request expires
Maximum price for the request.

Figure 4:
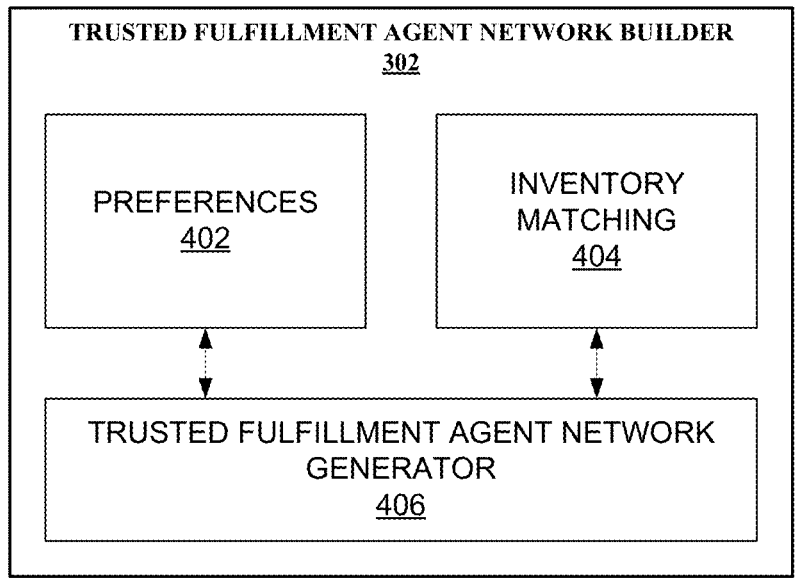
FIG. 4 shows a block diagram illustrating one example embodiment of a trusted fulfillment agent network builder module.

FIG. 4 shows a block diagram illustrating one example embodiment of the trusted fulfillment agent network builder module 302. The trusted fulfillment agent network builder module 302 includes, for example, a preferences module 402, an inventory matching module 404, and a trusted fulfillment agent network generator 406.

The preferences module 402 accesses trusted fulfillment agent preferences for the seller. The trusted fulfillment agent preferences include, for example, a rating level, a sales volume level, and/or a geographic location. The rating level may include a feedback rating on how an agent has performed as a trusted agent from other trusted fulfillment agent networks from the same or other online marketplaces. In another example, the rating level may include the number of trusted fulfillment agent networks a trusted agent belongs to, rating of the agent in specific categories, rating the delivery performance of the agent, rating based on the disputes initiated against the agent, etc.

The inventory matching module 404 matches an inventory of an agent with the items from the listing listed for sale by the seller in the online marketplace. In other words, the agent will verified to have at least one item in his/her inventory that matches an item in the listings of the seller.

The trusted fulfillment agent network generator 406 generates suggested agents to the seller based on the trusted fulfillment agent preferences and the inventory of the suggested agents. For example, the trusted fulfillment agent network generator 406 may generate suggested agents who have a high volume of transactions and who have at least a predetermined number of matching items in their respective inventory. After the trusted fulfillment agent network generator 406 generates the recommended agents, the seller may confirm and choose to send requests to one or more recommended agents to join his/her trust fulfillment agent network. A connection request would be sent to the selected agents who would need to accept the request in order to be part of the seller's trusted fulfillment agent network.

Apart from sending requests to agents in the same online marketplace, the seller can also send requests to agents in other online marketplaces, to business entities that only fulfill orders, and/or to other business entities that have a separate ecommerce identity on the internet. In that case, the seller may specify email addresses of such business entities that are not associated with marketplace application 120 to send requests to them. Upon receiving the request, these business entities may similarly wish to join the seller's trusted fulfillment agent network by going through a registration flow to register as a user in the marketplace application 120 and accept the request.

Figure 5:
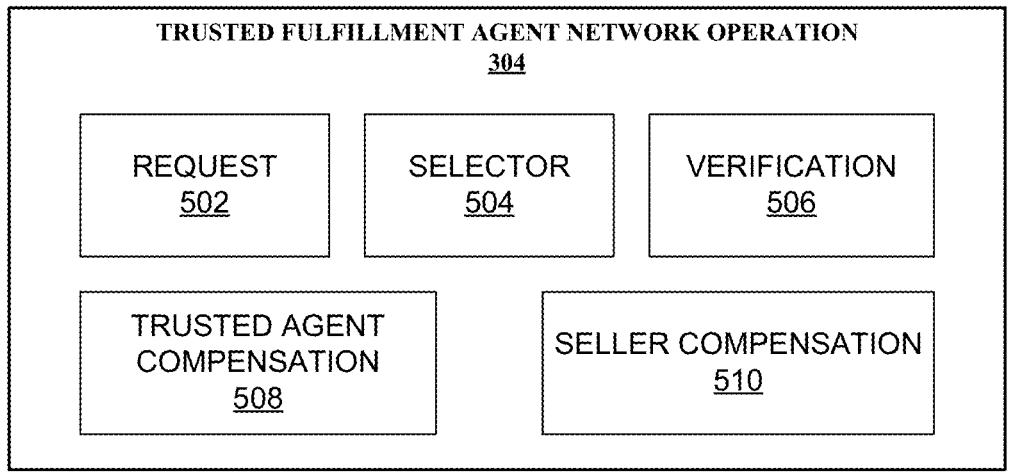
FIG. 5 shows a block diagram illustrating one example embodiment of a trusted fulfillment agent network operation module.

FIG. 5 shows a block diagram illustrating one example embodiment of the trusted fulfillment agent network operation module 304. The trusted fulfillment agent network operation module 304 may include a request module 502, a selector module 504, a verification module 506, a trusted agent compensation module 508, and a seller compensation module 510.

The request module 502 may submit a request to the network of trusted fulfillment agents. The request may identify the item, a partial destination address of the item, and a fulfillment compensation.

The selector module 504 may select a trusted fulfillment agent from the network of trusted fulfillment agents who responded to the request. For example, if there are several agents willing to fulfill the order on behalf of the seller, the seller may choose a trusted fulfillment agent to fulfill the order. In an embodiment, the seller may provide the selection criteria to the system and have the system automatically select a trusted agent for fulfilling a transaction. One example criteria for selection could be the price at which the trusted agent offers to have the order fulfilled—the trusted agent offering to fulfill at the lowest price could be selected. Another example of criteria could be the speed of delivery. The trusted agent that commits to having the order fulfilled fastest might be selected. A seller could setup the selection criteria to be a combination of criteria such as fulfillment price, delivery time commitment, etc.

The trusted fulfillment verification module 506 may verify a fulfillment of the shipment of the item by the trusted fulfillment agent.

The seller compensation module 510 may generate a compensation for the seller upon verification of receipt of the item by the buyer. In one embodiment, the seller compensation module 510 releases a first portion of funds from the buyer held by the online marketplace. The first portion of the funds corresponds to the compensation for the trusted fulfillment agent and the selling price of the item. The seller compensation module 510 also releases a second portion of the funds from the buyer held by the online marketplace.

The trusted fulfillment agent compensation module 508 may generate a compensation for the trusted fulfillment agent upon verification of the fulfillment of the shipment of the item. In one embodiment, the marketplace application 120 would make a payment of the amount paid by the buyer, to the seller's payment account, holding the funds or making the funds inaccessible by the seller until the delivery of shipment is confirmed by the buyer or the system. In such cases, upon verification of fulfillment of the order, the compensation amount agreed between the seller and the trusted fulfillment agent may be transferred to the trusted fulfillment agent's account, though it may still be held inaccessible by the trusted fulfillment agent.

Figure 6A:
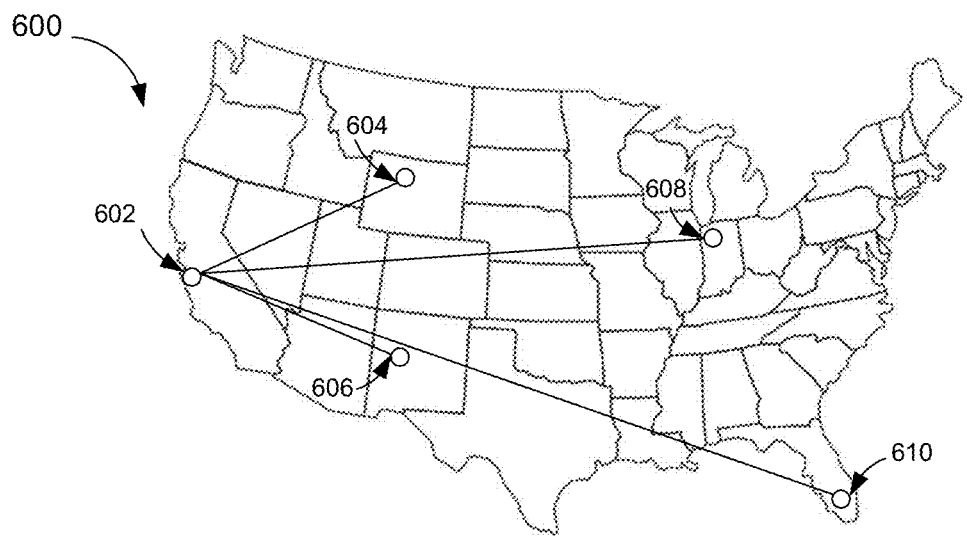
FIG. 6A shows a block diagram illustrating one example of a trusted fulfillment agent network.

FIG. 6A shows a block diagram illustrating one example of a trusted seller fulfillment network 600. A seller 602 may form a network with other trusted fulfillment agents 604, 606, 608, and 610 based on preferences set by the seller 602. In another embodiment, trusted fulfillment agents 604, 606, 608, and 610 may have the same item of a listing of the seller 602 in their corresponding inventory. In another embodiment, agents who do not have the same item in stock may be included in the trusted fulfillment network of the seller 602.

Figure 6B:
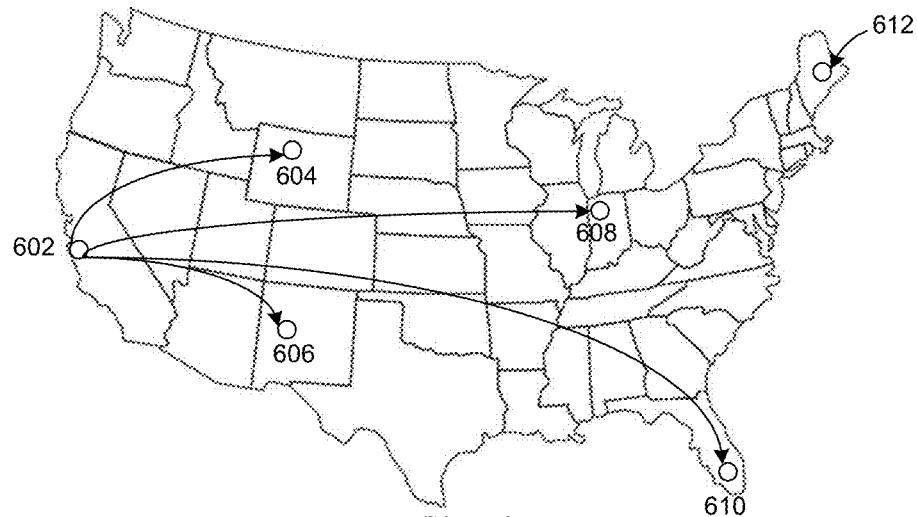
FIG. 6B shows a block diagram illustrating one example of a request to a seller's trusted fulfillment agent network.
Figure 6C:
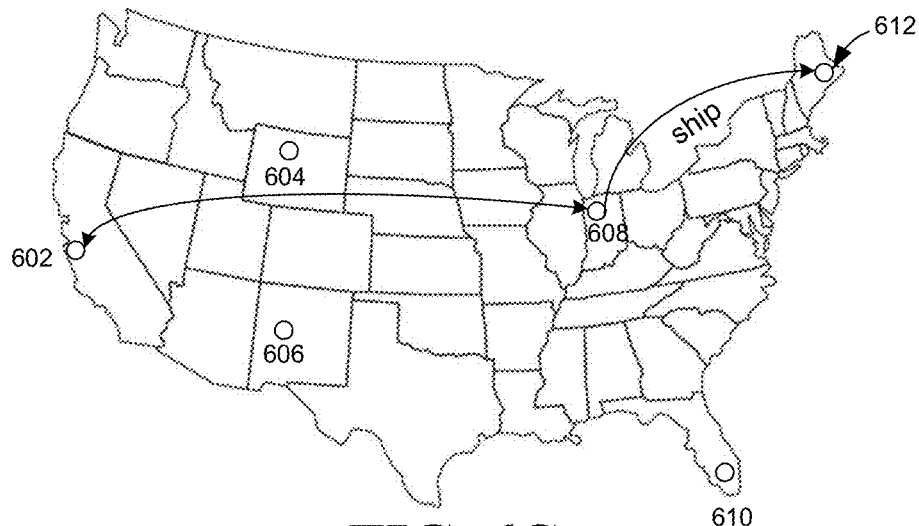
FIG. 6C shows a block diagram illustrating one example of an operation of a fulfillment by a trusted agent.

FIG. 6B shows a block diagram illustrating one example of a request to a seller's trusted fulfillment agent network. A buyer 610 places an order from the seller 602. The seller 602 may submit a request to his/her network of trusted agents 604, 606, 608, and 610 to fulfil the order by shipping an item corresponding to the order to the buyer 610. In one embodiment, the request may identify the item, a shipping address of the item (e.g., buyer 612's shipping address), a fulfillment compensation, the date by when the item needs to be delivered, and the date and time of expiry of the fulfillment request itself. Once one or more of the trusted agents responds to the request, the seller can select a specific trusted fulfillment agent who has replied to the request. A fulfillment agreement between the seller 602 and the trusted agent whose offer was accepted is established. FIG. 6C illustrates a fulfillment agreement between the seller 602 and the trusted seller 608.

FIG. 6C shows a block diagram illustrating one example of an operation of a fulfillment by a trusted agent. Trusted agent 608 fulfils the order on behalf on the seller 602 by shipping the item to the buyer 612. Once verification of the shipment is confirmed, the trusted agent compensation module 508 releases a portion of the funds received from the buyer 612 to the trusted agent 608. The portion of the funds may include at least the fulfillment compensation. Upon verification that the item has been received by the buyer 612, the trusted agent compensation module 508 releases another portion of the funds received from the buyer 612 to the seller 602.

In another embodiment, the marketplace application 120 would make a payment of the amount paid by the buyer, to the seller's payment account, holding the funds or making the funds inaccessible by the seller until the delivery of shipment is confirmed by the buyer or the system. In such cases, upon verification of fulfillment of the order, the compensation amount agreed between the seller and the trusted fulfillment agent may be transferred to the trusted fulfillment agent's account, though it may still be held inaccessible by the trusted fulfillment agent.

Example Scenario

The following illustrates an example of the trusted fulfillment agent network system that enables a seller to leverage their private trusted agents network to ship an item to a buyer.

Online marketplaces include many sellers that list many retail goods for sale. Buyers buy these items and sellers ship the items to the buyers after receipt of payment/funds by the online marketplace.

For sellers offering free shipping, cross-country shipments can cost more to ship as compared to an item to be shipped to an address closer to the seller. Apart from the shipping cost, the duration to ship is longer for items that are shipped cross-country.

By allowing a seller to network with other sellers/agents that the seller trusts, the seller can request a trusted seller/agent closer to the buyer to ship the item and compensate the trusted seller/agent for the item being shipped and shipping cost. For example, the request of the seller can be based on the following factors: price at which the item sold, the Final Value fees (FVF fees) charged by the online marketplace and other transaction merchants, insertion fees charged by the online marketplace, and the desired profit margin.

The seller may then submit a request to his/her trusted fulfillment agent network to ship the purchased item to the buyer at a specified price (based on, for example, the above four points). If a trusted fulfillment agent feels that the price at which (s)he is expected to fulfill an order gives a sufficient margin, they respond to the fulfillment request, naming the price at which they would be willing to fulfill the order.

The seller may:
  Request system to generate trusted fulfillment agent recommendations;
  Initiate fulfillment connection request to a recommended agent;
  Initiate a fulfillment connection request to an individual/entity not in the marketplace application 120;
  View fulfillment connection requests initiated by the seller;
  View fulfillment connections;
  Cancel fulfillment connections; and
  Initiate Order fulfillment request to the trusted fulfillment agent network (e.g. product, condition, price, quantity, buyer zip/state, fulfillment request expiry etc.)

Users of the marketplace application 120 that wish to become part of trusted fulfillment agent networks of one or more marketplace sellers may:
  View fulfillment connection requests;
  Respond to fulfillment connection requests;
  Accept fulfillment connection request;
  Reject fulfillment connection request;
  View fulfillment connections;
  Cancel fulfillment connections;
  Bid for fulfillment (e.g. fulfillment request id, bid amount)

Some advantages of the trusted fulfillment agent network are that:
  items travel shorter distance (better for the environment).
  shipping costs are less because the item is being shipped from a closer location that results in lower shipping cost.
  better buyer experience (buyer gets the item sooner).

Additional features for the trusted fulfillment agent network system:
  Seller branding: even though a different seller is shipping the item, the seller that owns the transaction may want their branding.
  Payment fees only once: in this scenario, buyer pays seller 1; seller 1 has to pay seller 2. However, fees should not be charged for the second payment neither by the online marketplace nor by the payment system.
  All communications to the buyer appear to come from seller 1.

Seller Information
  Seller 1 sells items on eBay and is based out of San Jose, California.
Product Info
  Title: Kinect Dance Central 2
  UPC: 885370316476
  Condition: New
  Quantity: 10
  Shipping: FREE, shipped via USPS Priority Mail
  Item weight—Between 2 lbs and 3 lbs
  Procurement cost: $30
  Sale Price: $49
Online Marketplace/Funds Transfer Fees
  Insertion Fee: $0.00
  Fees to be paid by seller upon a sale:
  Final Value Fees (13%): $6.37
  Funds transfer Fee (2.9%+$0.30): 1.72
  Total Fees: $8.09
  Net proceeds (without shipping cost) ($49.00−$8.09): $40.91

Scenario if Seller were to Ship the Items Directly to all their Buyers

Buyer 1 based out of Los Angeles purchases one quantity of this item.
  Cost to Seller 1 to ship item to Los Angeles: $6.05
Buyer 2 based out of New York purchases one quantity of this item.
  Cost to Seller 1 to ship item to New York: $12.82
If Seller 1 were to ship the item to Buyer 1, net proceeds will be $40.91−$6.05=$34.86. The net profit is $4.86.
If Seller 1 were to ship the item to Buyer 2, net proceeds will be $40.91−12.82=$28.09. The net loss is $1.91.

Scenario with Trusted Fulfillment Agent Network

Seller 1 wishes to establish a fulfillment network to which (s)he can outsource orders to.

Seller 1 uses the "Trusted Fulfillment Agent network" product to send fulfillment network connection requests to Seller 2, also an eBay seller, based out of New York.

Seller 1 uses the "Trusted Fulfillment Agent network" product to send fulfillment network connection requests to Fulfiller 3, not an eBay seller, based out of New Jersey.

Seller 2 accepts the Fulfillment Network connection request and is now a part of Seller 1's trusted fulfillment agent network.

Fulfiller 2 accepts the Fulfillment Network connection request from Seller 1 and is now a part of the Seller 1's trusted fulfillment agent network.

Buyer 1 based out of Los Angeles purchases one quantity of this item.
  Cost to Seller 1 to ship item to Los Angeles: $6.05
  Seller 1 ships this item to Buyer 1.
Buyer 2 based out of New York purchases one quantity of this item.
  Seller 1 puts out a request on to the trusted fulfillment agent network with the following information:
  UPC: 885370316476
  Condition: New
  Quantity: 1
  Shipping Service: USPS Priority Mail
  Buyer Zip code: 10007
  Must-ship-date: An appropriate date Fulfillment Request expiry: <30 minutes from time of posting>
Order Amount: $37.50
The order amount of $37 gives the Seller 1 the following profit:
$40.91–37.50=$3.41, if a partner in the trusted fulfillment agent network accepts the request.
Seller 2 accepts the fulfillment request and ships the item to the Buyer 2.
It costs Seller 2 $5.84 to ship the item to Buyer 2.
The net profit to Seller 2 is $37.50–$5.84–$30.00=$2.66 (assumes the procurement cost for Seller 2 is also $30.00)
The following is a table depicting the flow of money:

| Date | Description | Payment From | Payment To | Payment Amount |
|---|---|---|---|---|
| Mar. 8, 2012, 10am | Buyer 2 bought item from Seller 1 | Buyer 2 | Seller 1 (Funds held) | $49 |
| | FVF Fees | Seller 1 | eBay Inc | $ 6.37 |
| | PayPal Fees | Seller 1 | PayPal | $ 1.72 |
| Mar. 8, 2012, 10:15am | Seller 1 puts request in Fulfillment network | | | |
| Mar. 8, 2012, 10:30am | Seller 2 picks up the request from Fulfillment network | | | |
| Mar. 8, 2012, 10:35am | Seller 2 prints a shipping label for shipping item to Buyer 2 (assumes seller 2 is using eBay Label solution) | Seller 2 | eBay Inc | $ 5.84 |
| Mar. 8, 2012, 10:40am | eBay recognizes a fulfillment request has been shipped and initiates a payment from Seller 1 to Seller 2, from the funds that were earlier held. | Seller 1 (from the $49 that were moved from Buyer 2 to Seller 1 and held) | Seller 2 | $37.50 (Funds held) |
| Some time in future | Item delivered to Buyer 2. eBay recognizes item shows as delivered. Based on eBay Policy, money is released to Seller 1 | Seller 1 - Held funds | Seller 1 - No longer held | $49 |
| Immediately followed by | Trigger release hold on $37.50 transferred to Seller 2 | Seller 2 - Funds held | Seller 2 - Funds held | $37.50 |

Figure 7:
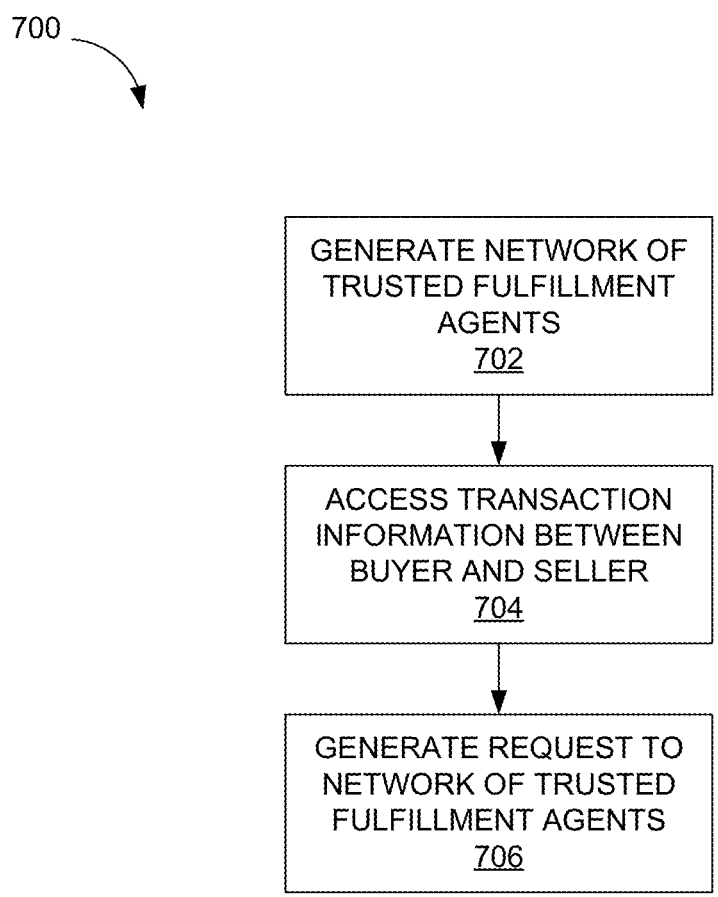
FIG. 7 shows a flow diagram illustrating one example embodiment of a method for a trusted fulfillment agent network.

FIG. 7 shows a flow diagram 700 illustrating one example embodiment of a method for a trusted fulfillment agent network. At operation 702, a network of trusted fulfillment agents is formed by a seller in an online marketplace. At operation 704, a transaction between a buyer and the seller corresponding to a listing of the seller in the online marketplace is accessed. At operation 706, a request is generated to the network of trusted fulfillment agents of the seller to fulfill a shipment of an item from the listing to the buyer on behalf of the seller.

Figure 8:
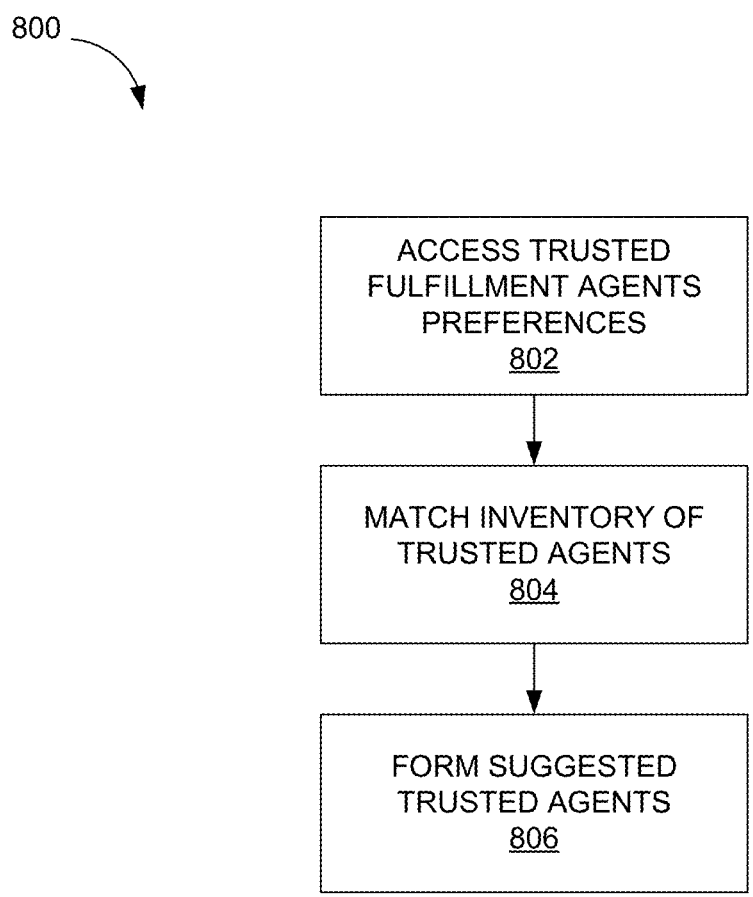
FIG. 8 shows a flow diagram illustrating one example embodiment of a method for building a trusted fulfillment agent network.
Figure 9:
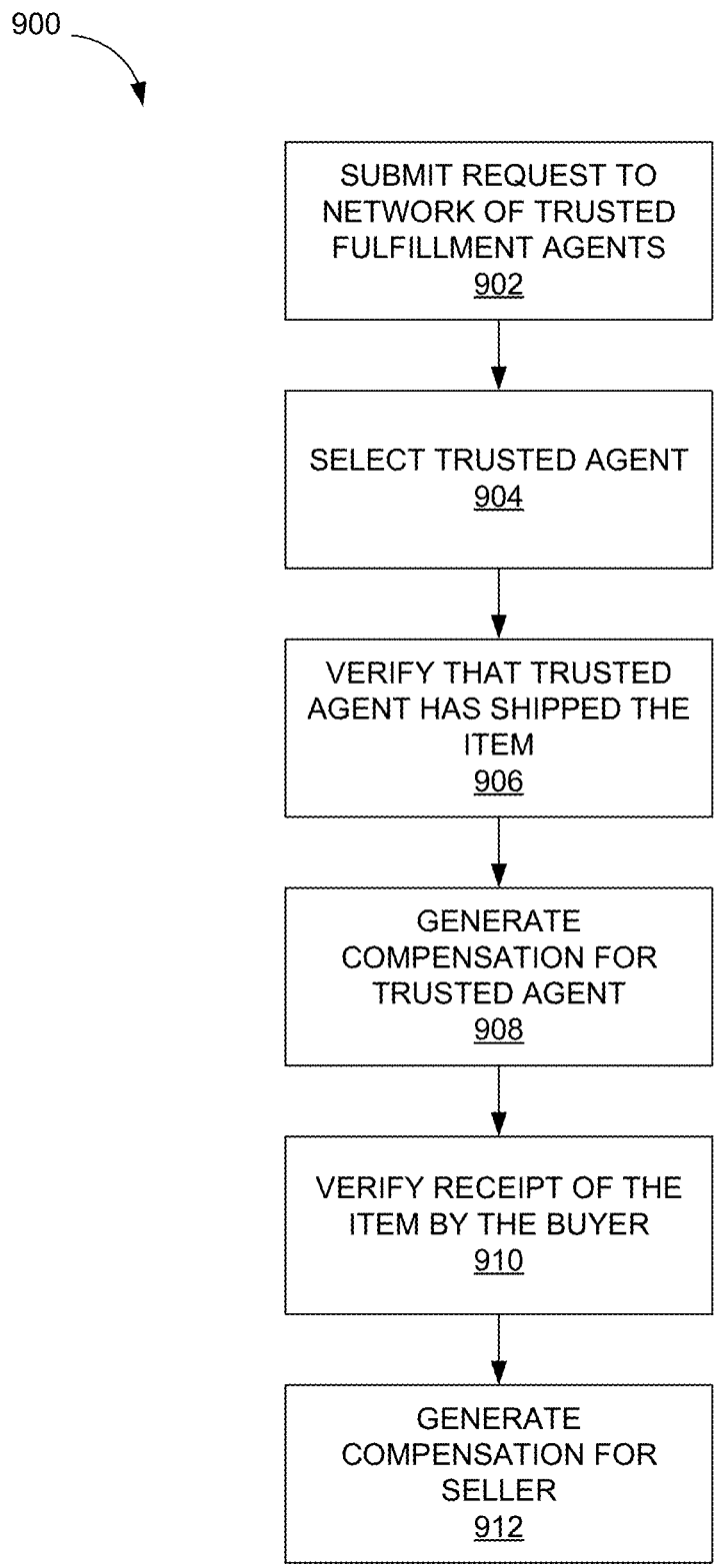
FIG. 9 shows a flow diagram illustrating one example embodiment of a method for operating a trusted fulfillment agent network.

FIG. 8 shows a flow diagram 800 illustrating one example embodiment of a method for building a trusted fulfillment agent network. At operation 802, trusted fulfillment agent preferences for the seller are accessed. At operation 804, an inventory of an agent is matched with the item from the listing. At operation 806, suggested agents are recommended to the seller based on the trusted fulfillment agent preferences and the inventory of the suggested agents. The network of trusted fulfillment agents is then formed based on the seller's selection of suggested agents, initiation of fulfillment connection requests to the suggested agents by the seller, and acceptance of the fulfillment connection by the agent FIG. 9 shows a flow diagram 900 illustrating one example embodiment of a method for operating a trusted fulfillment agent network. At operation 902, a request is submitted to the network of trusted fulfillment agents. The request identifies the item, a destination address of the item, and a fulfillment compensation. In one embodiment, the trusted fulfillment agent network operation module 304 waits for responses to the request from the network of trusted fulfillment agents. At operation 904, a trusted fulfillment agent is selected from the network of trusted fulfillment agents that responded to the request. At operation 906, a fulfillment of the shipment of the item by the trusted fulfillment agent is verified. At operation 908, a compensation is generated for the trusted fulfillment agent upon verification of the fulfillment of the shipment of the item. At operation 910, a receipt of the item by the buyer is verified. At operation 912, a compensation is generated for the seller upon verification of receipt of the item by the buyer.

In one embodiment, a first portion of funds from the buyer held by the online marketplace is released to the trusted agent who fulfilled the order. The first portion of the funds may correspond to the compensation for the trusted fulfillment agent and the selling price of the item. In another embodiment, a second portion of the funds from the buyer held by the online marketplace is released to the seller.

Method and Process of Using Offline Point of Service Location Based Resolutions

In one embodiment, the buyer's location may be determined and used to resolve the issue where a seller is out of stock of an already purchased item by the buyer. In that scenario, the seller may make a purchase at a local store for the buyer to go and pick up the item that the buyer has placed an order for with the seller.

In particular, the seller can make a purchase on behalf of the buyer through a system such as PayPal of eBay Inc. and have it as if the buyer paid for it. The money would come out of the seller's account. However, the transaction would look as if the buyer executed it. In another embodiment, the seller may use a geolocation service application, such as Milo of eBay Inc. to locate the inventory of the purchased item in the buyer's local area.

For example, a system like PayPal's POS system could be used for the buyer to complete the purchase. In this case, the seller could make the purchase and inform PayPal/eBay that the seller has resolved the out of stock inventory issue. PayPal would then go and pend the purchase waiting for the buyer to complete the purchase at the designated off line store (e.g., physical retail store).

In this scenario, the buyer would use their PayPal credentials at the offline POS system of the off line store. This action would release the transaction and allow the buyer to purchase the replacement item via the seller's account. The advantage is that the buyer now gets the benefits as if he bought the item (e.g. refund/replacement/etc.)

Example Computer System

Figure 10:
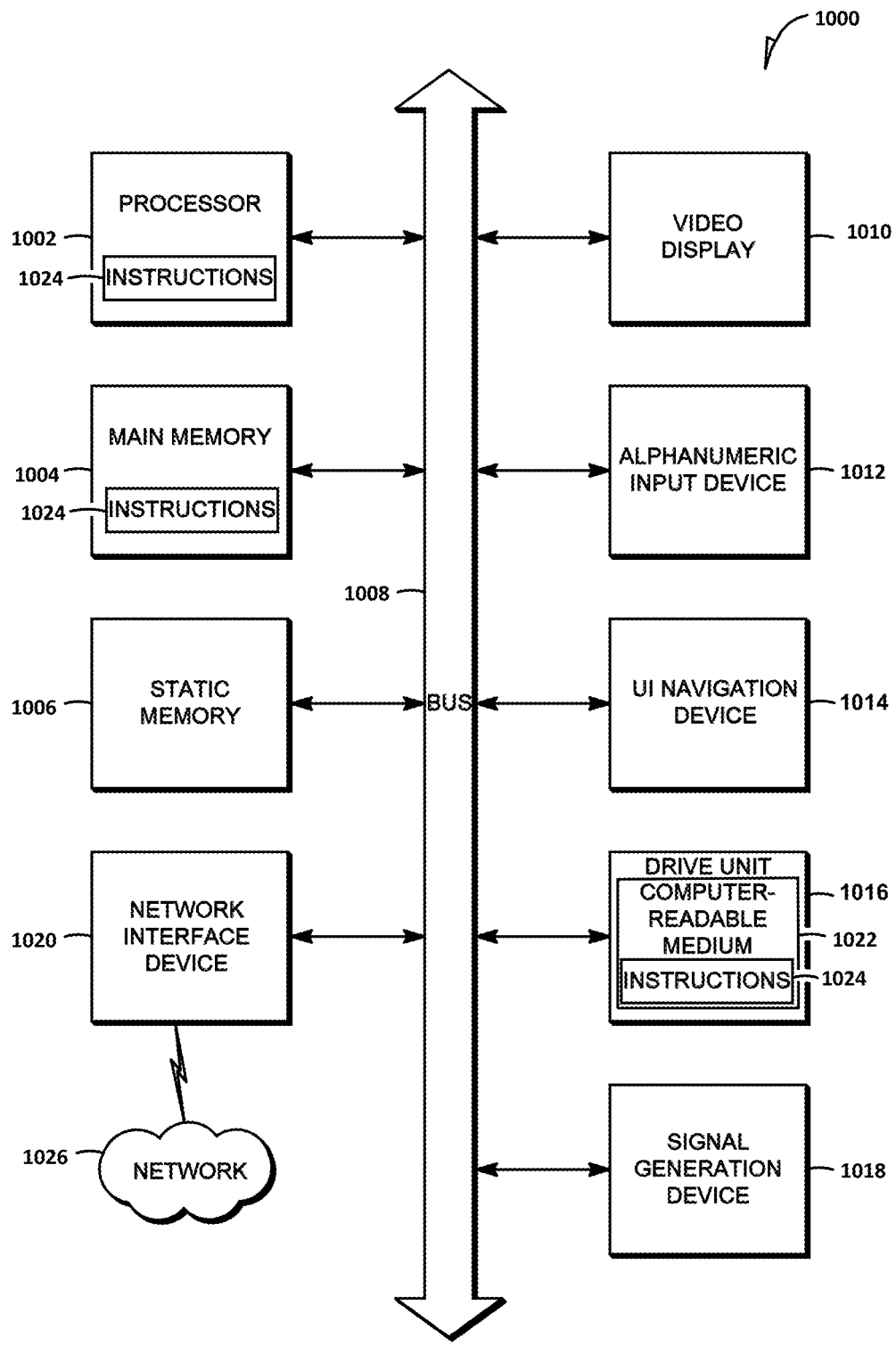
FIG. 10 shows a diagrammatic representation of machine in the example form of a computer system within which a set of instructions may be executed to cause the machine to perform any one or more of the methodologies discussed herein.

FIG. 10 shows a diagrammatic representation of a machine in the example form of a computer system 1000 within which a set of instructions may be executed causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, with the main memory 1004 and the processor 1002 also constituting machine-readable media.

The software 1024 may further be transmitted or received over a network 1026 via the network interface device 1020 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method performed by a computer system comprising a memory and at least one hardware processor, the method comprising:
   receiving a preference from a seller in an online marketplace, the preference identifying a feedback rating level for a fulfillment agent and a number of fulfillment networks the fulfillment agent belongs to;
   identifying a first plurality of fulfillment agents based on the preference and based on corresponding volumes of transactions fulfilled by the first plurality of fulfillment agents; and
   forming a fulfillment network for the seller, the forming of the fulfillment network for the seller comprising:
      providing a suggestion that the seller include the first plurality of fulfillment agents in the fulfillment network;
      receiving a confirmation that the suggestion to include the first plurality of fulfillment agents in the fulfillment network is accepted by the seller; and
      communicating a separate connection request to each agent in the first plurality of fulfillment agents identified based on the preference and based on the corresponding volumes of transactions.

2. The method of claim 1, wherein the forming of the fulfillment network for the seller further comprises:
   receiving indications that the separate connection requests are accepted by the first plurality of fulfillment agents.

3. The method of claim 1, further comprising:
   accessing a transaction between a buyer and the seller corresponding to a listing of the seller in the online marketplace; and
   generating a query to the fulfillment network of the seller to fulfill a shipment of an item from the listing to the buyer on behalf of the seller.

4. The method of claim 1, wherein the feedback rating level comprises an indication of how the fulfillment agent has performed.

5. The method of claim 1, wherein the preference further comprises a number of trusted fulfillment agent networks the fulfillment agent belongs to.

6. The method of claim 1, wherein the preference further comprises a sales volume level for the fulfillment agent.

7. The method of claim 1, wherein the preference further comprises a geographic location.

8. A system comprising:
   one or more computer processors;
   one or more computer memories; and a trusted fulfillment agent network application incorporated into the one or more computer memories, the trusted fulfillment agent network application configuring one or more processors of an online publication system to perform operations for implementing a trusted fulfillment agent network for a seller, the operations comprising:

receiving a preference from a seller in an online marketplace, the preference identifying a feedback rating level for a fulfillment agent and a number of fulfillment networks the fulfillment agent belongs to;

identifying a first plurality of fulfillment agents based on the preference and based on corresponding volumes of transactions fulfilled by the first plurality of fulfillment agents; and forming a fulfillment network for the seller, the forming of the fulfillment network for the seller comprising:

providing a suggestion that the seller include the first plurality of fulfillment agents in the fulfillment network;

receiving a confirmation that the suggestion to include the first plurality of fulfillment agents in the fulfillment network is accepted by the seller; and communicating a separate connection request to each agent in the first plurality of fulfillment agents identified based on the preference and based on the corresponding volumes of transactions.

9. The system of claim 8, wherein the forming of the fulfillment network for the seller further comprises:
receiving indications that the separate connection requests are accepted by the first plurality of fulfillment agents.

10. The system of claim 8, wherein the operations further comprise:
accessing a transaction between a buyer and the seller corresponding to a listing of the seller in the online marketplace; and
generating a query to the fulfillment network of the seller to fulfill a shipment of an item from the listing to the buyer on behalf of the seller.

11. The system of claim 8, wherein the feedback rating level comprises an indication of how the fulfillment agent has performed.

12. The system of claim 8, wherein the preference further comprises a number of trusted fulfillment agent networks the fulfillment agent belongs to.

13. The system of claim 8, wherein the preference further comprises a sales volume level for the fulfillment agent.

14. The system of claim 8, wherein the preference further comprises a geographic location.

15. A non-transitory computer-readable medium embodying a set of instructions, the set of instructions causing one or more computer processors to perform operations for implementing a trusted fulfillment agent network for a seller, the operations comprising:

receiving a preference from a seller in an online marketplace, the preference identifying a feedback rating level for a fulfillment agent and a number of fulfillment networks the fulfillment agent belongs to;

identifying a first plurality of fulfillment agents based on the preference and based on corresponding volumes of transactions fulfilled by the first plurality of fulfillment agents; and forming a fulfillment network for the seller, the forming of the fulfillment network for the seller comprising:

providing a suggestion that the seller include the first plurality of fulfillment agents in the fulfillment network;

receiving a confirmation that the suggestion to include the first plurality of fulfillment agents in the fulfillment network is accepted by the seller; and communicating a separate connection request to each agent in the first plurality of fulfillment agents identified based on the preference and based on the corresponding volumes of transactions.

16. The non-transitory computer-readable medium of claim 15, wherein the forming of the fulfillment network for the seller further comprises:
receiving indications that the separate connection requests are accepted by the first plurality of fulfillment agents.

17. The non-transitory computer-readable medium of claim 15, wherein the operations further comprise:
accessing a transaction between a buyer and the seller corresponding to a listing of the seller in the online marketplace; and
generating a query to the fulfillment network of the seller to fulfill a shipment of an item from the listing to the buyer on behalf of the seller.

18. The non-transitory computer-readable medium of claim 15, wherein the feedback rating level comprises an indication of how the fulfillment agent has performed.

19. The non-transitory computer-readable medium of claim 15, wherein the preference further comprises a number of trusted fulfillment agent networks the fulfillment agent belongs to.

20. The non-transitory computer-readable medium of claim 15, wherein the preference further comprises a sales volume level for the fulfillment agent.

* * * * *